Fig. 3

Dec. 21, 1937.  L. C. COLE  2,102,613
MACHINE TOOL
Filed Dec. 30, 1935  5 Sheets—Sheet 5

Patented Dec. 21, 1937

2,102,613

UNITED STATES PATENT OFFICE 2,102,613

MACHINE TOOL

Lyndon C. Cole, Hamilton, Ohio, assignor to General Machinery Corporation, Hamilton, Ohio, a corporation of Delaware Application December 30, 1935, Serial No. 56,630

18 Claims. (Cl. 29—33)

This invention relates to machine tools.

One of the principal objects of the invention is the provision, in a machine of the character in which work pieces are moved in succession on conveying means to a series of operating stations, of simple and effective means for presenting the work pieces to the different operating stations in different positions.

Another object of the invention is the provision of such a machine incorporating a surfacing operation as a step in the operating cycle, and which is so arranged that the work piece is first grasped in a predetermined position and is subsequently engaged by means such as yieldingly actuated cams to resist the forces of the surfacing tool and to effectively maintain the predetermined positioning during the surfacing operation.

A further object of the invention is the provision of such a machine having a movable head on which the tool is carried, the work being lifted into engagement with a locating surface forming a part of the movable head before the cutting operation is started.

Other objects and advantages of the invention will be apparent from the following description, the accompanying drawings and the appended claims.

In the drawings, which illustrate a preferred embodiment of the invention,—

The drawings, in which like characters of reference designate like parts throughout the several views thereof, illustrate a machine tool of that general character in which a plurality of operations are performed in succession on a work piece during its transit of the machine. As shown as an illustration of a preferred embodiment of the invention, the machine comprises a plurality of stations including a loading station A, a first machining station B, a station C in which the position of the work piece is changed prior to advance to a subsequent machining operation, a second machining station D, and an unloading station E where the work pieces are removed from the machine.

Figure 1:
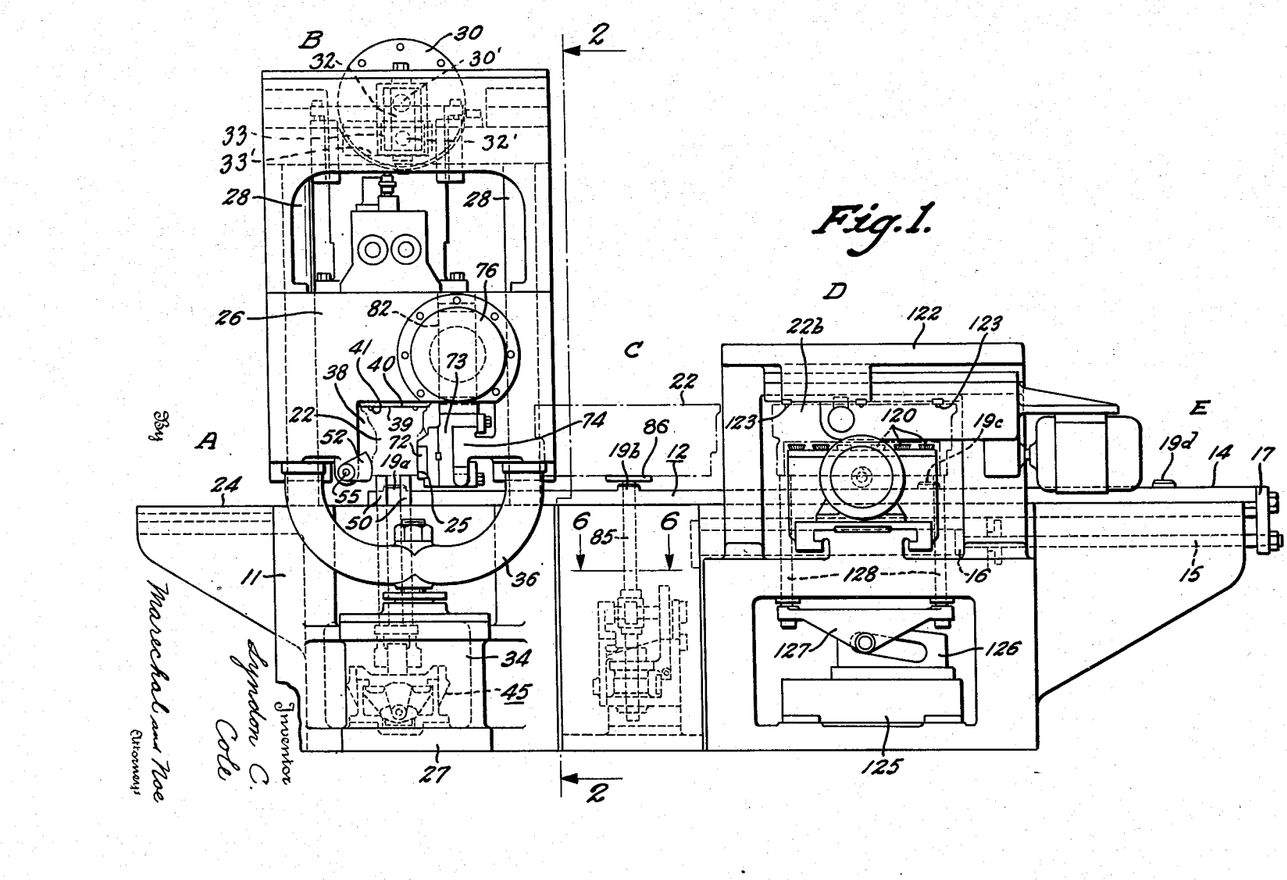
Fig. 1 is a side elevational view of a machine embodying the present invention.
Figure 2:
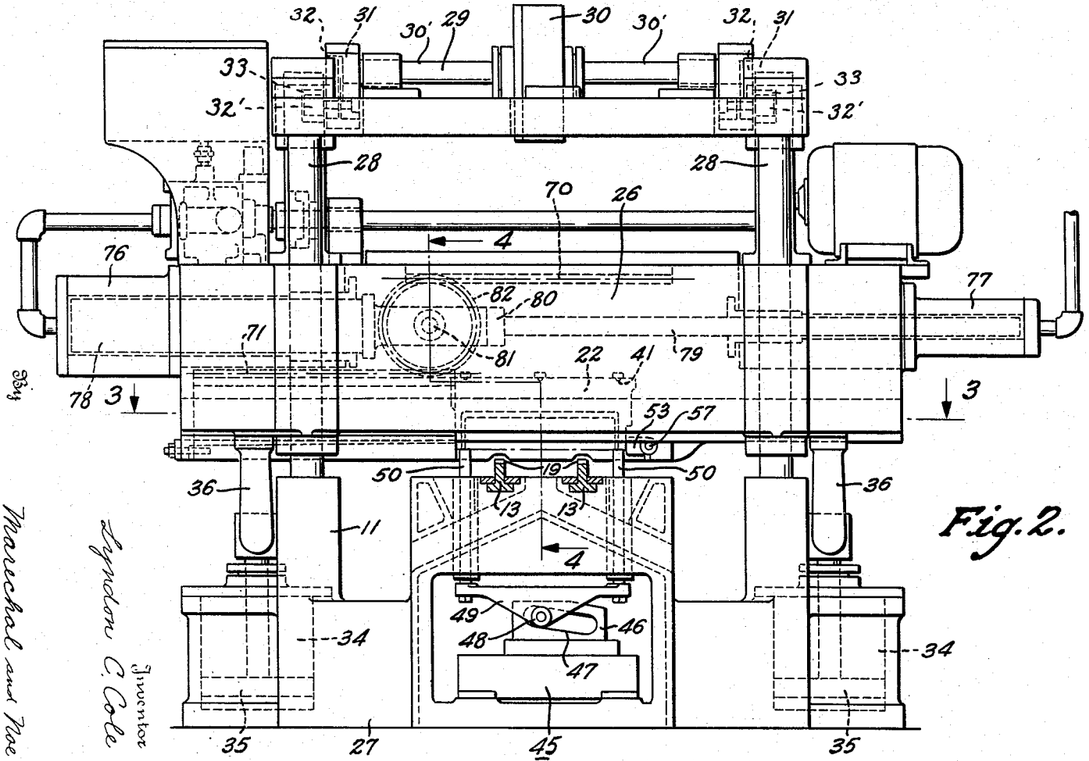
Fig. 2 is a transverse sectional view as indicated by the line 2—2 of Fig. 1.
Figure 3:
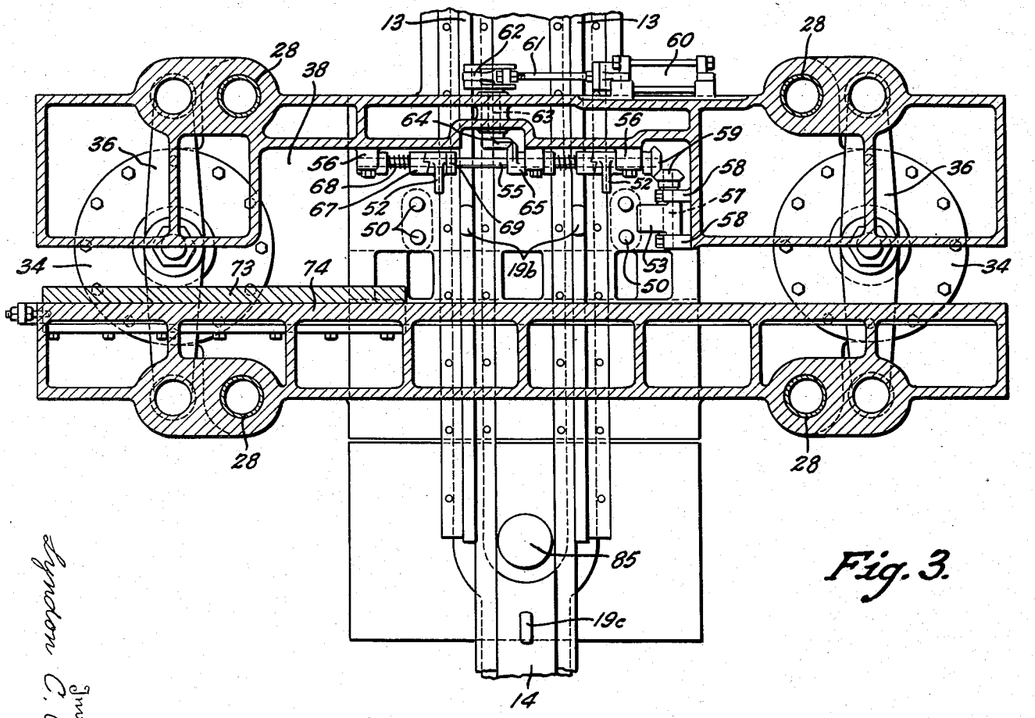
Fig. 3 is a horizontal section looking downwardly as indicated by the line 3—3 of Fig. 2.

A conveying means, designated generally by the numeral 12, serves to feed or move the work pieces to the several successive stations. In the illustrated embodiment of the invention a carrying track serves as a direct support upon which the work pieces slide during their feeding movement. The conveyor 12 is provided with locating means, preferably fixed lugs provided thereon, which serve to position the work pieces so that they are properly presented at the several cutting or other stations. The conveying means, as shown, is arranged to have a reciprocatory movement and is driven so that its movement is properly coordinated or timed to that of the other portions of the machine. The conveying means 12 is here illustrated as a draw bar extending for substantially the full length of the machine and having a bifurcated portion 13 (Fig. 3), and a portion 14 extending toward the unloading station. The conveying means is actuated through the medium of a hydraulic cylinder 15 within which is positioned a piston 16 connected at 17 to the right hand end of the draw bar as viewed in Fig. 1. The work contacting lugs 19 which stand upwardly at spaced points on the draw bar are so coordinated as to spacing to cause the work pieces to come to rest at proper positions to be operated upon at the several cutting stations.

In the illustrated embodiment of the invention the machine is arranged to provide a surface broaching operation (station B) and a subsequent milling operation (station D) upon engine cylinder blocks; one of which is indicated by the numeral 22. The machine is arranged so that the work pieces are applied thereto at the loading station A crosswise of the conveying means, that is, the long dimension of the cylinder block stands transversely with respect to the direction of movement of the draw bar. Loading occurs when the draw bar is in its left hand position of travel as viewed in Fig. 1 at which time the left hand lugs 19a stand within the loading area 24 so that a work piece may be applied. This portion of the draw bar, as mentioned above, is formed of spaced parallel arm portions 13, and the work contacting part is here arranged as laterally related lugs 19a which are integral with or are fixed to the conveyor and project upwardly therefrom. The lug relationship is such as to engage in a predetermined manner with the work piece such, for example, as by being received within spaced cylinder openings of the work piece.

Initial travel of the work piece within the machine is to move on the conveying means from the loading station A to the first machining operation B which, in the present instance, is a broaching operation which is performed upon a surface that stands beneath an overlying portion of the cylinder block. As shown, the cylinder block is carried with the portion of greatest width at the top side of the block. The surface to be broached, indicated by the numeral 25, lies beneath the overhanging top portion. In order to permit traverse of the work piece on the conveying means, and to afford an effective broaching operation, the first machining station B is arranged as a frame like structure 11 which includes a vertically reciprocable head 26 having a range of travel such that it may lift to a removed position wherein the work piece may pass beneath it, and may be lowered to an operating position in which the work piece is received therein in a predetermined positioning. As shown, the machine head 26 extends transversely of the direction of travel of the conveying means and is of sufficient length to accommodate the broach and its actuating mechanism. The head 26 is supported upon a base 27 having vertically extending guide rods 28 upon which the head has reciprocable movement. The upper portion of the guide rods serve to support an actuating mechanism 29 including a hydraulic cylinder 30 which has an operating connection to the head as indicated generally at 31 to produce the operating travel of the head. Energization of the cylinder 30 results in rotational movement of the shafts 30'. These, at their outer ends, carry cranks 32 having eccentric pins 32' that are engaged by slide blocks 33 which are laterally movable in guideways 33' of the saddle end, upon rotation of the shafts 30', cause vertical movement of the saddle.

Air cylinders 34 are provided in the base for reception of pistons 35 which connect through the yokes 36 to the head and serve to provide a cushioned support for the head and thus assist the operating mechanism 29.

The underside of the head 26 is recessed as indicated at 38 and has a flat face 39 to receive the work piece 22 for operation thereon. As shown, the recess is of sufficient width that the head may be lowered over the work piece without encountering interference; the lower limit of travel being a position in which the head face 39 is adjacent to but spaced from the work piece a distance somewhat greater than the vertical height of the driving lugs 19a. After the head descends to the lowermost position the work piece is lifted from the conveyor into surface engagement with the head face 39 through provision of lifting means that function additionally to hold the work piece in operating position. During the interval that the work piece is removed from the conveyor the draw bar may return to the initial loading position. As shown, the lifting means comprises a hydraulic cylinder, designated generally by the numeral 45, that is positioned in the machine so that its travel is transverse to the direction of travel of the head. The movable portion of this hydraulic assembly comprises a guided cam 46 having an inclined face 47 that is traversed by a roller 48 supported in a frame 49 that is caused to reciprocate vertically as the hydraulic assembly traverses its range of movement. Reference is here made to my copending application Serial No. 26,550, filed June 14, 1935, wherein the lifting mechanism is shown and described in detail. The frame 49 carries upstanding pins 50 which are arranged to engage the lower face of the work piece 22 for elevation of the work piece and the head. Suitable locating means are provided in the head such, for example, as downwardly projecting pins 41 on the head face 39 that are adapted to engage pin receiving sockets in the upper face 40 of the work piece. Interengagement of the pins and sockets affords a predetermined positioning of the work piece in the head.

The clamping action of the hydraulic assembly 45 is such that the work piece is securely held within the head in the predetermined position as defined by the locating pins 41. In order that this predetermined positioning may be maintained during the broaching operation additional clamping means are afforded to effectively withstand the broach forces. As shown, the additional clamping means comprise cams 52 and 53 that stand within the head recess and are arranged to engage the side faces of the work piece after initial engagement of the holding means. In order that the clamping action of the cams will not disturb the predetermined positioning of the work piece but will serve to prevent displacement of the work piece during the broaching operation the cams are yieldingly mounted so that the engaging movement may terminate upon contact with the work piece. The work piece therefore, although effectively held in position, is not moved from its predetermined positioning. As shown, the cams 52 are rotatably mounted upon a shaft 55 which is journalled at 56 in the head, and the cam 53 is carried by a shaft 57 which is journalled at 58 in the head. The shafts 55 and 57 are interconnected by bevel gears as indicated at 59 and all are interconnected for actuation from a hydraulic cylinder assembly 60. As shown, the cylinder assembly has a movable piston rod 61 which connects to the arm 62 of a rock shaft 63 that terminates in a bevel gear 64 meshing with a bevel gear 65 that is fixed to the shaft 55. Clamping forces are communicated to the cams 52 through provision of clutch members 67 which are urged toward engaging position through provision of springs 68. The clutch members 67 have a saw toothed end portion which mates with a similarly formed face on the cams 52; the positioning of the saw teeth being such to provide a frictional driving engagement so that as the cams move toward engaging position any resisting forces greater than the driving force of the springs 68 will cause the cams to come to rest while further travel of the actuating shaft 55 is absorbed in the springs 68 by free movement between the inclined faces of the cams and the clutch members 67. The cams are prevented from moving axially away from the springs. As viewed in Fig. 3, the left hand cam 52 is prevented from moving axially by the collar 69 that is fixed to the shaft 55 while a similar result is obtained in the right hand cam 52 by having it engage the shaft supporting member 56 as shown.

The contour of the cam faces is such that they provide a clamping action upon engaging the work piece to thus effectively prevent distortion or displacement of the work piece during the broaching action which, as shown, occurs upon a face opposite to that held by the cams 52 and in a direction such that the cam 53 will resist any tendency toward displacement.

Figures 4, 5, 6:
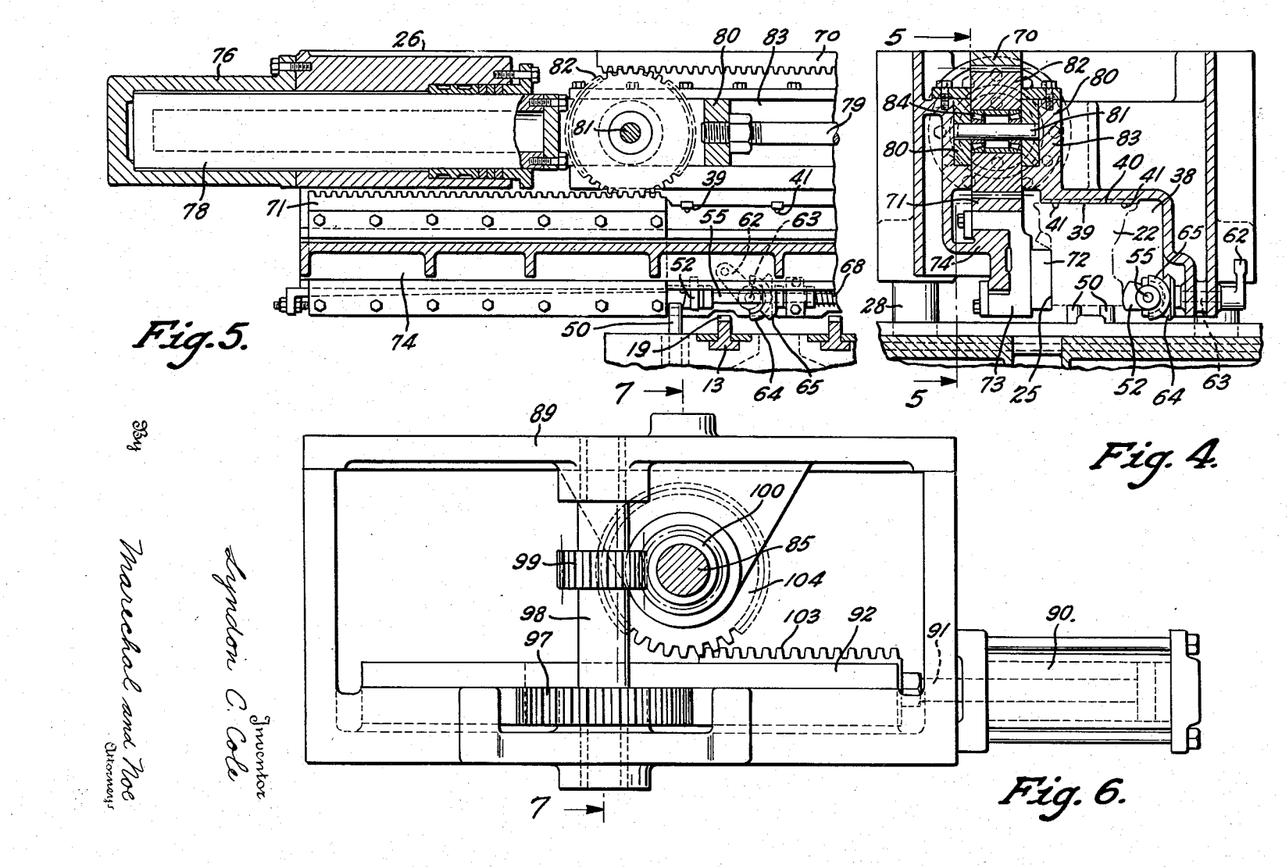
Fig. 4 is a fragmentary sectional view as indicated by the line 4—4 on Fig. 2.
Fig. 5 is a fragmentary sectional view as indicated by the line 5—5 on Fig. 4.
Fig. 6 is a horizontal section looking downwardly as indicated by the line 6—6 on Fig. 1.

The broach, indicated by the numeral 72, is carried by member 73 that is reciprocably mounted upon a guideway 74 which forms an integral part of the head 26. The guideway is of sufficient length that the broach and its supporting structure may move from a position which is entirely to one side of the work piece to a position in which the broach stands entirely beyond the opposite end of the work piece. Broach actuation occurs through the provision of hydraulic cylinders which, as shown, comprise a drive cylinder 76 and a return cylinder 77. As shown, the piston assembly for these cylinders is arranged as a unit and comprises a piston 78 for the driving cylinder and a piston 79 for the return cylinder which have a common central portion 80 that is constructed as a yoke and carries a shaft 81 for support of a spur gear 82. The yoke 80, as shown in Fig. 4, is mounted in a suitable guideway 83 that is a fixed part of the head 26. The gear 82 is carried on the shaft 81 through the medium of antifriction bearings 84.

The gear 82 has meshing engagement with a rack 70 which is fixedly mounted within the head and with a rack 71 that is fixedly mounted to the broach assembly; this construction serving to provide a broach travel which is twice the travel of the yoke and thus affords a compact assembly wherein the broach may traverse a considerable distance while the driving structure is effectively housed within a restricted space. An effective broaching operation obtains by maintaining a predetermined pressure in the return cylinder 77 during the working stroke so that any tendency for the broach to jump ahead or to chatter during the cutting operation is prevented by the pressure within the cylinder 77.

The broach feeding movement occurs in the interval that the work piece is held within the head and removed from the conveying means. Upon completion of the broaching stroke the work piece is lowered to the conveying means which, during the interval of broaching, has returned to its initial position so that now the feeding lugs 19b stand at the operating station B to receive the work piece when lowered. The transfer of the work piece to the draw bar is completed by lifting the head 26 to afford clearance for advancing movement of the work piece. As the head lifts the broach is returned to its initial position for a subsequent operating stroke.

Figure 7:
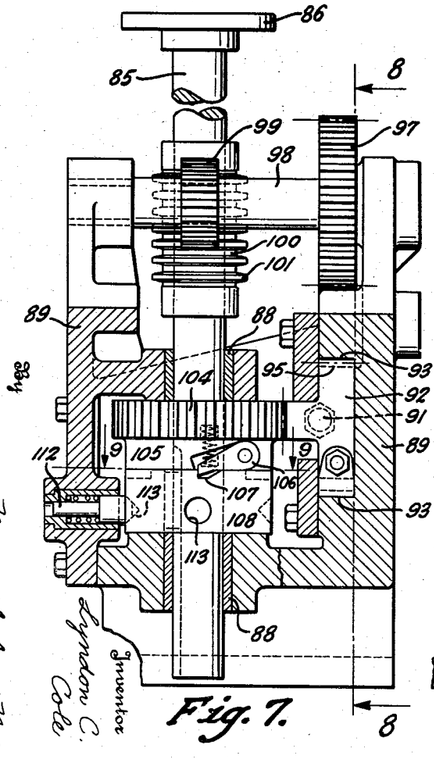
Fig. 7 is a vertical section as indicated by the line 7—7 on Fig. 6.
Figures 8, 9:
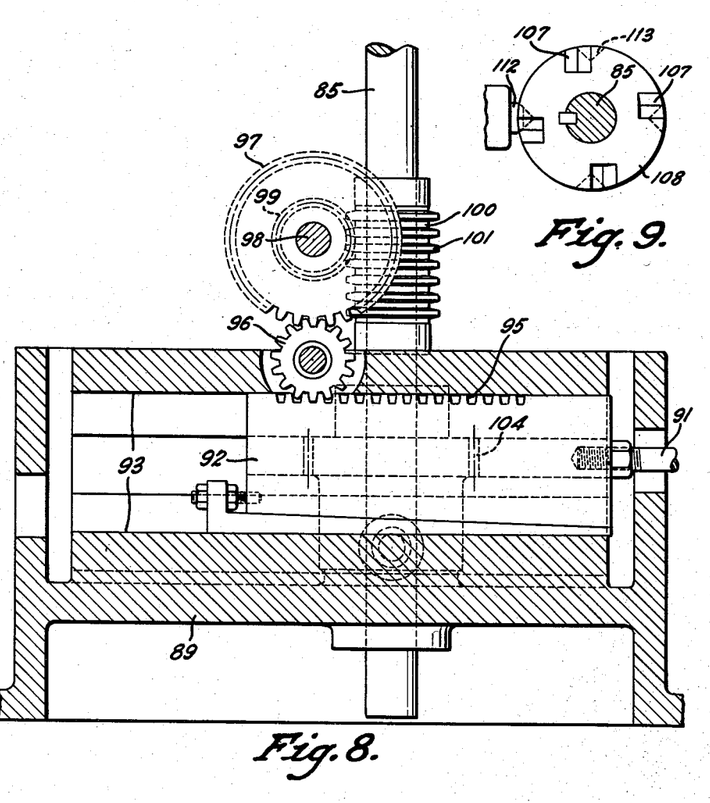
Fig. 8 is a vertical section as indicated by the line 8—8 on Fig. 7.
Fig. 9 is a fragmentary sectional view as indicated by the line 9—9 on Fig. 7.

As soon as a clear path is afforded for the work piece the draw bar again advances carrying the work piece from station B to station C which includes mechanism for altering the position of the work piece so that it is presented to a subsequent machining operation in a position different from that in which it is received at the first machining station B. As shown, (Figs. 3, 6, and 7) a plunger 85 stands between the bifurcated arms 13 of the draw bar. This plunger is arranged to be lifted and turned so that a work piece engaged thereby is removed from the conveyor and is given a rotational movement of 90° to thus bring the work piece into a position in which the long dimension stands parallel the direction of travel of the conveying means.

As shown, the plunger 85 terminates at its upper end in a flat plate 86 of sufficient area to adequately lift and support the work piece. The lower portion of the plunger 85 is guided in spaced bearings 88 forming part of a frame structure 89 that is integral with or is affixed to the base of the machine. The operating cycle of the plunger 85 is obtained from a hydraulic cylinder assembly 90 which has a reciprocable piston rod 91 that is connected to a bar 92. The bar 92 is guided as indicated at 93 for reciprocatory travel within the frame 89. As shown, the bar 92 has formed thereon a rack portion 95 which meshes with a pinion 96 that in turn meshes with a gear 97 that is fixed to a shaft 98 that is rotatably supported in the frame 89. The shaft 98 also has fixed to it a pinion 99 which has a driving engagement with the plunger 85 through the medium of member 100 which has formed thereon annular gear teeth 101. The annular teeth serve to maintain meshing engagement regardless of the rotational movement of the plunger. Through the intermeshing gear assembly described immediately above reciprocatory travel of the bar 92 causes vertical reciprocatory movement of the plunger 85. A second rack portion 103 is provided on the bar 92 and is adapted to engage a gear 104 that is freely mounted on the plunger 85. As shown, the gear 104 has an elongated hub portion 105 which carries a spring pressed pawl 106 that is adapted to successively engage the angularly spaced notches 107 of a collar 108 having splined engagement with the plunger 85 so that rotational advance of the gear 104 is thus communicated to the plunger as a turning movement. The angular travel imparted to the gear 104 by reciprocation of the rack carrying bar 92 advances the pawl through an operating stroke of 90 degrees. The notches 107 of the collar 108 are spaced accordingly.

The lifting and turning movements of the plunger are so coordinated that the work piece is initially lifted from the conveying means by an amount sufficient to release it from the lugs 19 prior to the institution of the turning movement. As shown, the driving connection from the rack portion 95 to the intermeshing gear 96 is a positive one in which the plunger travel corresponds to that of the reciprocable bar 92. The drive through the rack portion 95 including the gear 104, however, is not a positive connection in that it incorporates the pawl 106. The overrun necessary to seat the pawl 106 in each succeeding notch 107 delays the rotational movement until sufficient lifting movement has taken place to permit the work piece to stand clear of the draw bar. The rotational movement of the plunger is in intermittent steps continuing in one direction. The plunger position during the dwell portion of the cycle is maintained by a spring pressed detent finger 112 which is adapted to engage depressions 113 that are spaced apart 90° in the face of the collar 108. The operating cycle at the station C is therefore such that the work piece is initially lifted from the draw bar and, as the lifting movement continues, is then turned through an angle of 90° and is subsequently lowered again into engagement with the draw bar. During this interval of operation the draw bar is moved to its left hand position so that the work piece is then engaged by a lug 19c which is provided on the single bar portion 14 of the draw bar.

Having returned the work piece to the draw bar it is then advanced to station D by a subsequent advance in travel of the conveying means.

Here the work piece is subjected to operation by a plurality of milling cutters which are indicated by the numeral 120. These cutters are supported in a head structure 122 which, like the head 26 described above, is provided with locating lugs 123 to receive the work piece in a predetermined positioning. The work is lifted from the conveying means and is held against the head during actuation of the cutters by means comprising a hydraulic cylinder assembly 125 which corresponds in function and arrangement to the hydraulic cylinder assembly 45. The assembly 125 comprises a cam member 126 which, during movement of the hydraulic assembly, raises a frame 127 carrying upright pins 128 into engagement with the work piece 22b so that the work piece is lifted with the head 122 to enable the conveying means to return to initial position during the interval that the work piece is being operated on. Return movement of the conveying means brings the work engaging lug 19d to a position beneath station D so that upon subsequent return of the work piece to the conveying means it may be moved forwardly upon the next advancing stroke to the station E from which it is removed from the machine.

A suitable centralized control system is provided so that the various operations of the machine occur in coordinated sequence; the arrangement of the control being such that during traverse of the draw bar in the advancing direction of travel the several work holding means and the turning mechanism stand in a removed position so that the work pieces may advance without interference. During the return traverse of the draw bar the previously advanced work pieces are all engaged at the several stations and are removed from contact with the draw bar so that it may freely return without interference. The actuating interval of the draw bar with respect to the cycle of operation at the several machining stations is such that a sufficient dwell occurs at the extremes of drawbar travel to enable the work pieces to be applied at the entering station A and to be removed at the terminal station E.

The incorporation of a turning station intermediate the operating stations permits of a compact structure in that the broaching structure, which is of necessity of considerable length, stands crosswise of the direction of travel of the conveying means so that the operating stations are required to be spaced apart only an amount sufficient to enable the work pieces to be turned for entrance into the following operating station. In addition, as the broach is arranged to surface a portion of the work piece which stands beneath an overhanging portion thereof, transverse travel of the broach permits a simple application of the work piece to the broaching head. It is thought also that it will now be apparent that a further advantage obtains in the provision of a head structure wherein the broach, although traversing beneath an overhanging portion of the work piece, may be securely mounted, and the work piece likewise may be securely held so that a positioning movement of the broach subsequent to engagement of the work piece is rendered unnecessary. The work piece is not only securely held against the surface which affords the predetermined positioning therefor but in addition the work piece is held laterally against the broach forces by a simple mechanism which is sufficiently yielding in its actuation to not influence the positioning of the work piece but which likewise, when once engaged, rigidly maintains the work piece against the distorting influence of the broach during actuation.

While the form of apparatus herein described constitutes a preferred embodiment of the invention it is to be understood that the invention is not limited to this precise form of apparatus, and that changes may be made therein without departing from the scope of the invention which is defined in the appended claims.

What is claimed is:

1. A machine of the character described comprising conveying means adapted to move a work piece to a predetermined position, a work engaging head movable from a retracted position affording clearance for movement of a work piece on the conveyor to an operating position adjacent the predetermined position of a work piece on the conveyor, means for moving the head to operating position, means to move the work piece from the conveyor when in the predetermined position thereon into engagement with said head, a cutting tool movably carried by the head to traverse the work piece, and means to move the cutting tool.

2. A machine of the character described comprising conveying means adapted to move a work piece to a predetermined position, a work engaging head movable transversely with respect to the direction of travel of the conveying means from a retracted position affording clearance for movement of the work piece on the conveyor to an operating position adjacent the conveyor, locating means in the head affording a predetermined position of the work piece therein, means for moving the head to operating position, means to move the work piece from the conveyor when in the predetermined position thereon into engagement with the locating means of the head, a cutting tool movably carried by the head to traverse the work piece, and means to move the cutting tool.

3. A machine of the character described comprising conveying means adapted to move a work piece to a predetermined position, a work engaging head movable from a retracted position affording clearance for movement of a work piece on the conveyor to an operating position adjacent the predetermined position of a work piece on the conveyor, means for moving the head to operating position, means to move the work piece from the conveyor when in the predetermined position thereon into engagement with the head, additional holding means carried by said head, means to actuate said additional holding means into holding engagement with a work piece engaged by said head, a cutting tool movably carried by the head to traverse the work piece, and means to move the cutting tool.

4. A machine of the character described comprising a reciprocable conveying means adapted to move a work piece to a predetermined position, a work engaging head movable from a retracted position affording clearance for movement of a work piece on the conveyor to an operating position adjacent the predetermined position of a work piece on the conveyor, means for moving the head to operating position, means to move the work piece from the conveyor when in the predetermined position thereon into engagement with the head, a reciprocable broach carried by said head and adapted to traverse a held work piece, and means to traverse the broach for a working stroke during engagement of a work piece by the head.

5. A machine of the character described comprising a frame, reciprocable conveying means movable thereon to advance work pieces through the machine, a head movable on said frame, work holding means movable on said frame perpendicularly to the direction of travel of the conveying means to lift the work piece from engagement with the conveying means, said head having a work locating portion movable toward said conveying means for cooperation with said holding means in locating the work piece, and cutting means guided in the head and having a working stroke perpendicular to the paths of travel of the holding means and the conveying means and movable from a position at one side of the work piece to a position at the opposite side thereof, said cutting means traversing the working stroke and the conveying means traversing the return stroke in the engaged position of the holding means.

6. A machine of the character described comprising a frame, reciprocable conveying means movable thereon to advance work pieces through the machine, a head movable on said frame, work holding means movable on said frame perpendicularly to the direction of travel of the conveying means to lift the work piece from engagement with the conveying means, said head having a work locating portion movable toward said conveying means for cooperation with said holding means in locating the work piece, and broaching means guided in the head and having a working stroke perpendicular to the paths of travel of the holding means and the conveying means and movable from a position at one side of the work piece to a position at the opposite side thereof, said broaching means traversing the working stroke and the conveying means traversing the return stroke in the engaged position of the holding means, the broach traversing the return stroke and the conveying means traversing the feeding stroke in the disengaged position of the holding means.

7. A machine of the character described comprising a frame, reciprocable conveying means movable therein and having spaced work feeding means thereon for intermittent advance of work pieces through the machine, a reciprocable head movable from a remote position with respect to the conveyor to a position adjacent the conveyor for reception of a work piece therefrom, work holding means movable perpendicularly to the conveyor and adapted to engage and remove a work piece from the conveyor during dwell at termination of feeding travel of the conveying means and to carry said work piece into engagement with said head, broaching means guided in the head and having a working stroke perpendicular to the paths of travel of the head, the holding means and the conveying means, said broaching means traversing the working stroke in the removed position of the work piece during which it is engaged by the head, said holding means returning the work piece to the conveying means following termination of the broach working stroke, the work piece being delivered to a receiving station of the conveying means during the dwell at termination of return travel of the conveying means.

8. A machine of the character described comprising a plurality of spaced stations for successive operation upon work pieces, reciprocably moving work conveying means extending between said stations and adapted to convey work pieces from one station to another in a predetermined sequence, and means between two of the stations for moving a work piece out of engagement with said conveying means and turning the work piece, said last mentioned means being operable in timed sequence to movement of the conveying means and effective to remove the work piece from engagement with said conveying means in the dwell at one limit of reciprocatory travel of the conveying means and to return the turned work piece at the opposite limit of travel of the conveying means.

9. In a machine of the character described comprising a plurality of stations for successive operation upon work pieces, conveying means for successively moving the work pieces to present the same to the different stations, means between the stations operable to lift and turn the work piece with respect to the conveying means, said turning means comprising a reciprocable member movable perpendicularly to the direction of travel of the conveying means, and operating mechanism movable through an operating cycle and effective in the initial movement to perpendicularly move the reciprocable member and subsequently effective to rotate the reciprocable member during a portion of the reciprocatory movement.

10. In a machine of the character described comprising a plurality of stations for successive operation upon work pieces, conveying means for successively presenting the work pieces to the different stations, said conveying means comprising two spaced parallel members movable together, work feeding means on said parallel members comprising a pair of fixed lugs positioned transversely of the direction of movement of the conveying means, a reciprocable member positioned between the parallel conveying members and movable perpendicularly thereto to lift a work piece from the feeding lugs of the conveyor and to turn it with respect to the conveying means, and means to move the reciprocable member to lift a work piece from the conveying means and to turn said member during a portion of the lifting movement.

11. In a machine of the character described comprising a plurality of stations for successive operation upon work pieces, conveying means for successively presenting the work pieces to the different stations, said conveying means comprising a reciprocable member having a single bar portion and a bifurcated part in extension thereof, means to reciprocably move the conveying means, work feeding means on the conveying means comprising longitudinally spaced fixed lugs on the single bar portion and longitudinally spaced laterally related pairs of fixed lugs on the bifurcated portion, a reciprocable member for lifting and turning the work pieces, said lifting and turning member being positioned between the parts of the bifurcated portion adjacent the junction of the bifurcated portion with the single bar portion, means to move the reciprocable member to lift a work piece from the driving lugs of the bifurcated portion and to turn said member during a portion of the lifting movement, the positioning of the feeding lugs and the extent of movement of the conveying means being coordinated to deliver a work piece to the reciprocable lifting and turning member in feeding engagement with the lugs of the bifurcated portion at one limit of the conveying travel, and to receive a turned work piece from the reciprocable member in feeding engagement with a lug of the single bar portion at the other limit of the conveying travel.

12. In a machine of the character described having spaced operating stations and conveying means for moving work pieces to successive stations, means positioned between two of the stations for turning the work piece with respect to the conveying means, said turning means comprising a reciprocable member, driving means for lifting and turning the reciprocable member, said driving means having a plurality of operating connections to said member effective to turn the reciprocable member subsequent to initiation of the lifting movement.

13. In a machine of the character described having spaced operating stations and conveying means for moving work pieces to the stations in succession, means positioned between the stations for turning a work piece with respect to the conveying means, said turning means comprising a member reciprocable perpendicularly with respect to the direction of movement of the conveying means, reciprocable driving means for the turning member comprising a member having a plurality of rack portions and oscillatory driving means therefor, and means for successively engaging the rack portions with the reciprocable member to first produce an axial movement thereof followed by a turning movement.

14. In a machine of the character described having spaced operating stations and conveying means for moving work pieces to the stations in succession, means positioned between the stations for turning a work piece with respect to the direction of travel of the conveying means and comprising a reciprocable lifting member, reciprocable driving means therefor comprising a plurality of rack portions simultaneously movable, said reciprocable lifting member having annular teeth axially spaced thereon, gear means intermeshing with one of said rack portions and the annular teeth for axial movement of the reciprocable lifting member upon movement of said driving means, a one-way clutch driven by another of said rack portions, and means splined to the reciprocable lifting member for driving engagement by the one-way clutch to impart rotational movement to the reciprocable lifting member upon actuation of said driving means.

15. A machine of the character described comprising a frame, a broach slidably carried by the frame and adapted to traverse a work piece, driving means for the broach comprising oppositely positioned hydraulic cylinder assemblies, a common member connecting the pistons of said hydraulic cylinder assemblies, a gear rotatably carried by said common member, a rack fixed to said frame and in meshing engagement with said gear, a second rack fixed to said broach and in meshing engagement with said gear for movement of said broach upon actuation of the driving means, one of said cylinders driving the broach for a feeding stroke and the other of said cylinders driving said broach for a return stroke.

16. A machine of the character described comprising conveying means adapted to move a work piece to a predetermined position, a work engaging head movable from a retracted position affording clearance for movement of a work piece on the conveyor to an operating position adjacent the predetermined position of a work piece on the conveyor and in the path of travel of the work piece, means for moving the head to operating position, means to move the work piece from the conveyor when in the predetermined position thereon to an operating position at a predetermined elevation above the feeding elevation of the work piece, a cutting tool movably carried by the head to operate on the work piece, and means to move the cutting tool.

17. A machine of the character described comprising conveying means adapted to move a work piece to a predetermined position, a work engaging head movable from a retracted position affording clearance for movement of a work piece on the conveyor to an operating position adjacent the predetermined position of a work piece on the conveyor and in the path of travel of the work piece, means for moving the head to operating position, means to move the work piece from the conveyor when in the predetermined position thereon into engagement with said head, a cutting tool movable to operate on the work piece, and means to move the cutting tool.

18. A machine of the character described comprising conveying means adapted to move a work piece rectilinearly to a predetermined position, a work engaging head movable from a retracted position affording clearance for movement of a work piece by the conveying means to an operating position adjacent said predetermined position of the work piece and in the path of travel of the work piece, means for moving said head to operating position, means to move the work piece when in said predetermined position into engagement with said head, a cutting tool movable to operate on the work piece, and means for operating the cutting tool.

LYNDON C. COLE.